United States Patent Office 3,567,645
Patented Mar. 2, 1971

3,567,645
SILICA DESICCANTS AND METHOD OF MANUFACTURE
Juergen Dultz, Hannover, Germany, assignor to Kali-Chemie Aktiengesellschaft, Hannover, Germany
No Drawing. Filed Nov. 23, 1965, Ser. No. 509,429
Claims priority, application Germany, Nov. 25, 1964, K 54,622
Int. Cl. C09k 3/00
U.S. Cl. 252—194                    17 Claims

ABSTRACT OF THE DISCLOSURE

A process for manufacturing silica gel desiccants having high resistance to water, high attrition resistance, and high drying capacity, which comprises making a hydrosol, forming a hydrogel therefrom, cooling and aging the hydrogel, washing and drying it, and calcinating the resulting silica gel at a temperature between about 300 to 450° C. The silica gel desiccants of high resistance to water, high desiccant and high attrition resistance.

---

This invention relates to the manufacture of inorganic gels for use as desiccating agents and adsorbents. More specifically, the invention is directed to the manufacture of inorganic oxide gels comprised of silica or predominantly of silica and having a high capacity to adsorb moisture. According to a specific preferred embodiment, the invention is of particularly high value in the manufacture of spheroidal particles of desiccant comprised of silica or predominantly of silica. The invention also provides novel desiccants made from silica gels having a combination of unusual physical stability with high resistance to water.

This invention provides a process for making silica gels useful as desiccants which have high water-resistance and unusual resistance to abrasion. Desiccants based on silica are commonly known as gels, extruders or as gel beads. In practice, gel beads are particularly desirable because of their resistance to abrasion, impact and pressure. In contrast to other forms of gels, the gel beads (because of their crushing strength and mechanical stability) can be used in moving beds as well as in processes involving continuous drying and regeneration. Because the gel beads arrange themselves in uniform layers in the reaction vessel, excellent stream and diffusion conditions are attained, and therewith a full and complete utilization of the desiccants.

It is described in U.S. Pat. 2,462,798 which is incorporated herein by reference, to make desiccants from silica gels by mixing a sodium silicate solution with an acid solution, forming a hydrosol, coagulating the hydrosol to a hydrogel which contains zeolytic alkali metal such as sodium ions, promptly cooling the resulting gel after its gelation, curing in an aqueous solution at a temperature below that at which gelation occurs, without substantial base exchange taking place during a substantial period of time before syneresis is complete, and thereafter base exchanging with a suitable aqueous solution, such as a solution of an acid or a metal salt, in order to remove the zeolitic alkali metal, such as sodium ions which are bound, washing and drying the hydrogel, and further tempering the gel at a temperature of up to 200° C. in dry air. The process for making a bead, or spheroidal silica gel desiccant is described for instance in U.S. Pat. 2,384,-946. This disclosure is incorporated herein by reference. In that process, silica gels in form of beads useful as desiccants are obtained by suspending a hydrosol having the inherent property of setting into a firm hydrogel preferably one having a relatively short gelation time such as 1 per 10 seconds, in a fluid immiscible with the hydrosol as individual particles or droplets and keeping them in suspension therein until they are fully set into a firm hydrogel. Then, the resulting beads are introduced into an adjacent, cooled water layer and after separation by a stream of water within the aqueous layer, the gel beads are subjected to the above described aging base exchanging and heating steps.

The time for formation of the gel is determined by suitable selection of the temperature, the pH-values and the concentration of the reagents. The mechanical strength of the silica gels, particularly such as that of silica beads can be increased by incorporating into the silica gel up to about 3% by weight, based on the dry weight of the gel, of alumina, zirconia, ferric oxide and chromium oxide. For the incorporation of the metal oxide in the hydrogel at the time of formation, a suitable compound of the metal may be added to one of the reactant solutions. For example, aluminium sulfate, in the corresponding amount, may be added to the acid solution or sodium aluminate may be added to the water glass solution.

It is further known to increase the resistance of attrition of inorganic oxide gels, and therewith also of the desiccants made from silica gels particularly the silica gel spheroids, by incorporating in the hydrosol a certain amount of a solid powdered material which is insoluble in the hydrosol, i.e. that it maintain its powdered status upon, dispersion in the sol and that it be infusible at the temperature of drying the hydrogel or at the temperature of calcination where such later treatment is employed, in amount corresponding to between 5 and 40 percent by volume of the dried gel and which has an average diameter, determined by weight, between about 1 to 5 microns, preferably between 2 and 4 microns. Pulverulent additives of this type, which are well suited for addition to the pure or to the silica gel containing up to 3% alumina or an other oxide are the following: pulverulent dried gels, such as those of silica, silica-alumina, silica zirconia, and the like, or silicon oxide in its various forms, including cristobalite and quartz, or metal silicate, e.g. aluminium silicate, and zirconium silicate, as described in U.S. Pat. 2,900,349.

For instance, such fine pulverulent additives may be incorporated into the desiccant as produced according to the above-described process. The fine powdered additive is introduced into the alkali siilcate solution and allowed to remain in contact with it for a suitable time. In practice, about 0.005 to one hour, and a temperature between 21 and 32° C. has been found satisfactory, At higher temperatures, a shorter contact time is needed. The increase in the improvement in the abrasion resistance of the spheroids for any given diameter of the additive, is dependent upon the amount of the powdered material in the dried gel. Within any given narrow range of additive, a certain maximum improvement is reached. The particular desired range of additive is dependent upon the composition of the gel phase and of the dispersed phase. The amounts of the various components can be adjusted to best suit the desired product.

The desiccants manufactured on the basis of silicic acid, however, have the serious disadvantage, as all highly active small-pored silica gels, that they are not water resistant, i.e. they have no water-permanence or stability or durability in water. When thrown into water, dried silica gels burst into fractions as soon as water penetrates into their pores. Such silica gels are not resistant to water sprays in gaseous streams. They readily burst or splinter under such influence into smaller fractions until they are a sandy residue which can greatly impede the flow of gas through the desiccant. This is therefore a very serious problem which confronts those skilled in this art to manufacture desiccants made from silica gels which are of adequate physical strength and yet resistant to water.

Attempts have been carried out to produce water resistant desiccants based on silicic acid. Until now, however, such water-resistant products could only be produced by sacrificing high drying capacity. It is known that gel beads made at a pH below 6 from desiccated gels, can be transformed into water-resistant silica gels by calcination at temperatures between 500 and 900° C. Such gels, however, because of their low drying capacity, can no longer be useful as desiccants. Such products allow only for a limited utilization of the whole volume of the dried mass. Such products are mostly used as protective layers for highly active silica gels. The decrease in absorption capacity of the silica gels upon heating to high temperatures is associated with the breakdown of the gel structure, according to an article in Angewandte Chemie 40, page 431, left column, para 4 (1927). In accordance therewith upon heating of the silica gels up to about 400° C., some kind of crystallization process sets in which brings about a decrease in absorption capacity which becomes increasingly more noticeable as the temperature increases. In view of this literature reference, it had to be assumed that the partial water-resistance of the silica gels which is achieved by heating to above 500° C., is the rseult of a stepwise transformation of the gel into a crystallized product.

It has been found in accordance with the invention that silica gels, particularly silica gel beads with high water resistance for use as desiccants, can be produced at temperatures at which the crystallization process has not yet set in. This object is achieved by a process which comprises manufacturing the above-described desiccated silica gels, or silica gel beads which contain fine silica gel powders which has an average diameter of between 1 to 5 microns in an amount of the narrow maximum range of addition to obtain optimal improvement of resistance to abrasion. Suitable to silica gels are the pure or the silica gels containing up to 3% alumina. Pulverulent addition are powdered dried gels, such as silica gel-powder or silica-alumina gel-powder with or without pulverulent additions, e.g. manufactured by grounding from dried off-size beads of the desiccants.

It is an aspect of this invention that such highly-abrasive and stable silica gels can be calcinated to products of high water-resistance already at temperatures below 500° C., more specifically between 300 and 450° C. I prefer the calcination temperatures of between 300 and 400° C. It is a characteristic that the silica gel beads produced in that manner, still have a high desiccative or absorption capacity after the calcination, as compared with the silica gel beads which are activated only at 200° C. As has already been described above, the abrasive strength of the silica gel beads depends, with any given particle diameter, on the amount of the added pulverulent silica gel and shows a maximum in a narrow range of additive. If the addition of powdered material is kept below the optimal range of additive, then at the drying with decreasing amounts of the additive beads will be obtained that are cracked in the center to an increasing degree. Thus water-resistant products cannot be obtained by calcination at temperatures below 400° C. If, however, the amount of powdered additive material in the silica gel beads is too high, then during desiccation, the beads tend to become increasingly non-uniform and soft at their surface. No uniform abrasive-resistant and water-resistant silica gel beads can then be obtained when calcination takes place between 300 and 400° C. It has been found by determining the abrasion resistance of the gel beads that the maximum range for addition of the above-described solid pulverulent materials is between about 25 and 33 percent by volume based on the volume of the dried gel.

It has further been found in accordance with the invention that the temperature at which the dried silica gel beads which are loaded with pulverulent additive materials, and have maximal abrasive strength, attain their water-resistance is related to the aging period of the hydrogel during the production process. When the silica gel beads, admixed with additive materials, are aged between about 1.5 to about 7 hours, at low temperatures, there are obtained a highly satisfactory yield of whole beads, which are equivalent in drying capacity to those without the added additive materials. The vibration weight, i.e. the weight of the gel beads relative to the volume, of such silica gel beads, admixed with additive materials, decreases with continued aging as that of those without the additive materials. With increasing aging periods, the shrinking of the gel beads takes place to a smaller extent during the desiccation which follows. With increasing aging period, the silica gel beads develop which have a larger average diameter of pores, for which an almost or perfect water-resistance can be achieved already at relatively low temperatures. In accordance with the invention, silica gel beads which have an alumina content of about 3% and to which there was added 30 volume percent of fine additives and after a 6 hour aging period at 4° C., can be transformed by calcination at 300° C. into a product with a water resistance of more than 99%. The drying capacity of such product approximates that of a product which was dried only in overheated steam at a temperature of up to 180° C. and activated at 200° C. If the gel forming phase is followed by only a 3 hour aging period, then a calcination temperature of from about 380 to 400° C. is necessary in order to bring about the beads' water resistance of 95%. Calcination temperatures of up to about 500° C. can further somewhat improve the water resistance. However, since from there on, the loss of drying capacity increases disproportionately, the upper temperature limit should preferably be at about 400° C. The calcination in air is generally carried out during a period of from 0.5 to 24 hours. A further advantage of the calcination in accordance with the invention is that the abrasive strength of the silica gel beads increases to at least 1.5 times as much as the beads activated only at 200° C. The calcination is advisedly carried out under a continuous air current. It is preceded by drying to about 200° C.

The same relationship between aging period of the hydrogel and calcination temperature of the desiccated beads for the production of water-resistant products applies when the starting material is pure silica gel beads which are changed by addition of silica gel powder into silica beads of maximal abrasive strength. Likewise other silica gels can be transformed in similar manner into products of any and various other physical shapes having high water resistance.

The following examples are merely illustrations of the invention and are not to be construed as a limitation thereto.

EXAMPLES 1–6

A silica dioxide gel which has about 2.8 weight percent aluminum oxide based on dry weight, is produced with varying contents of dispersed fine silica gel additives of the same composition and an average diameter of 3.8 microns. The effect of the fine additive content on the abrasive strength of the silica gel beads is then studied.

All percentages are given by weight unless designated differently. An acid solution was made up which contained a mixture of 7.59% sulfuric acid, 0.78% aluminum sulfate, and 91.63% of water. The alkali suspension was obtained from an 80 percent volume water glass solution containing 19.65% silicon oxide ($SiO_2$), 5.86% sodium oxide ($Na_2O$) and 74.49% water, and a 20% volume of an aqueous suspension with amounts varying between 24.4 and 34% weight of fine gel additives of 97% by weight of $SiO_2$ and 2.8 of aluminum oxide $Al_2O_3$. The residence period of the fine additives in the alkaline solution prior to the addition of acid solution was about 5 minutes. By mixing together the acid and alkaline suspension in a proportion of about 1:1, a sol was obtained which gels in about 3.5 seconds at 25° C. to a hydrogel. The sol was made in accordance with the method described in U.S. Pat. 2,462,798 columns 4 and 5 into a bead-shaped hydrogel having pH-value of 6.9. The hydrogel was aged, thereafter, for 2 hours at 4° C. in stagnant sluice water. Thereafter, it was treated with a 0.5% aluminum sulfate solution to exchange the sodium still bound to the silica with aluminum. The base exchange took place in four consecutive phases, whereby each time a fresh aluminum sulfate solution was used. The temperature at which the first two base exchanges were carried out was 4° C., the third and fourth exchanges were carried out at room temperature. The gel was then washed of soluble salts, dried in overheated steam at 120 to 180° C. for 3 hours, and tempered at 204° C. for 8 hours in a dry air stream.

The content of fine particles of additive in percent volume, based on the dried gel, about corresponds to the weight percent of the added amounts of fine particles.

The abrasion resistance of the gel beads is then determined in accordance with an abrasion test using a Lauson Machine, giving an LSA value.

The test is carried out as follows: 50 ccm. of the product to be tested was shaken in a sealed cylindrical steel mug provided with bores; the steel mug is connected by means of rivets to the piston of a motor-driven Lauson Machine which revolves at the rate of 1000 revolutions per minute. After shaking for a time which is sufficient to produce 10 percent by weight of material fine enough

TABLE—I. ABRASION RESISTANCE

| Examples: | Percent by weight of additive to aqueous suspension of the particles | LSA values in seconds |
|---|---|---|
| 1 | 34 | 56 |
| 2 | 31.6 | 121 |
| 3 | 30.2 | 271 |
| 4 | 28.5 | 280 |
| 5 | 26.6 | 180 |
| 6 | 24.4 | 45 | to pass through a sieve (of a mesh width of 2.362 mm. and a wire strength (thickness) of 0.813 mm.), the tested material is then sifted and weighed, and the percentage loss determined. These steps of the test are repeated until more than about half of the test material is transformed into fine material. The cumulative losses are recorded on a chart as against total shaking period for each repeated part of the test. The cumulative time, in seconds, for 50 percent by weight fine material is the read from the chart, above, and according to the Laudson-shaking-test, reported as abrasion.

It is apparent from these data that the addition of fine particles of silica gel additive in the range of about 25.0 to about 33 and preferably 27.5 to about 31 weight percent of the aqueous suspension in the above alkaline solution results in silica gel beads having a maximum abrasion resistance.

EXAMPLE 7

Silica gel beads desiccants of high water-resistance were prepared by mixing the acid and the alkaline solutions described in Example 1 from which a sol was prepared which gelled to a hydrogel in 3.5 seconds at 25° C. There were admixed to the alkaline solution 29.8 weight percent of the fine particles. The sol is made into hydrogel beads as described above. The resulting hydrogel particles which have a pH of 6.9 are then aged in water at 4° C. The length of the aging period was varied for the various tests from 2 to 6 hours. Then, the hydrogel was washed four times every 3.5 hours with fresh portions of an aqueous 0.5% aluminum sulfate solution to replace any residual sodium bound in the silica gel by aluminum.

The first two base exchanges were carried out at 4° C., the following ones, at 25° C. The hydrogel beads were then washed with distilled water until free of sulfate and then they were dried in superheated steam for 3 hours at 120° to 180° C.

The samples which have been subjected to the varying lengths of aging periods were then calcined under a current of dry air for a period varying from 0.5 to 8 hours at a temperature varying from 300° to 400° C. In the resulting gels, the amount of fine silica gel additive is 30 percent volume based on the dried gel. The drying capacity and the water-resistance of the products is determined as follows. Two hundred grams of silica gel beads are dried for 8 hours at 160° C., then water is poured on the beads while they are still hot and then allowed to stand immersed in water for another half hour. After procedure is repeated four times, the products are agitated in a ball mill (without any balls) for 15 minutes and the proportion of whole beads in weight percent is determined.

The drying capacity of the individual product was shown by means of the breakpoint capacity. To this effect a humid stream of air of 75% relative humidity is passed, at 20° C., at a velocity of 20 cm./sec. through a layer of silica gel beads (50 cm. long and 2 cm. of thickness). The test is discontinued when the exiting air reaches a dew point of −40° C. The results show the weight increase of the desiccant gel, in percent, and the time in which this increase took place. The data are tabulated below.

TABLE II.—PROPERTIES OF THE GELS

| Example | Aging time of the hydrogel in hours | Vibration weight in g./cm.³ | LSA values in seconds | Water-resistance in weight percent | Break-point capacity in weight percent/ minutes | Calcination Time in hours | Temperature |
|---|---|---|---|---|---|---|---|
| 7 | 2 | 0.74 | 360 | 0.0 | 19.0/390 | | |
| 8 | 2 | 0.76 | | 79.1 | 15.5/370 | 8.0 | 360 |
| 9 | 2 | 0.77 | 900 | 87.0 | 13.7/285 | 8.0 | 400 |
| 10 | 2 | 0.78 | | 93.9 | 11.1/224 | 8.0 | 440 |
| 11 | 3 | 0.71 | 205 | 0.0 | 20.1/420 | | |
| 12 | 3 | 0.72 | | 86.9 | | 8.0 | 340 |
| 13 | 3 | 0.72 | | 69.6 | | 0.5 | 360 |
| 14 | 3 | 0.72 | | 83.4 | | 1.0 | 360 |
| 15 | 3 | 0.72 | | 85.4 | | 3.0 | 360 |
| 16 | 3 | 0.72 | | 89.6 | 16.3/320 | 8.0 | 360 |
| 17 | 3 | 0.74 | | 94.3 | | 8.0 | 380 |
| 18 | 3 | 0.74 | | 95.4 | 15.2/319 | 8.0 | 400 |
| 19 | 3 | 0.74 | | 97.6 | | 8.0 | 420 |
| 20 | 3 | 0.75 | 540 | 98.8 | 13.4/275 | 8.0 | 440 |
| 21 | 6 | 0.64 | | 0.0 | 20.8/372 | | |
| 22 | 6 | 0.64 | | 99.1 | 18.0/305 | 8.0 | 300 |
| 23 | 6 | 0.65 | | 99.8 | 16.8/316 | 8.0 | 360 |
| 24 | 6 | 0.66 | | 99.8 | 13.8/265 | 8.0 | 400 |

EXAMPLES 25–29

Silica gel beads desiccants of high water-resistance were prepared by mixing an acid solution which contained 7.96% sulfuric acid and 92.04% water and an alkali suspension containing an 80 percent volume water glass solution with 18.72% silicon oxide ($SiO_2$), 5.58% sodium oxide ($Na_2O$), and 75.70% water, and a 20% volume of an aqueous suspension with 30.3% of fine additives of 97% by weight of $SiO_2$ and 2.8 of aluminum oxide and of an average diameter of 3.8 microns. A sol was prepared which gelled to a hydrogel in 3.5 seconds at 25° C. The sol is made into hydrogel beads as described above. The resulting hydrogel particles which have a pH of 6.9 are then aged in water at 4° C. for 4 hours in stagnant sluice water. Thereafter, it was treated with a 0.3% sulfuric acid solution for 16 hours at 4° C. and with 0.2 sulfuric acid solution for 8 hours at room temperature to exchange the sodium still bound to the silica with hydrogen. The gel beads were then washed of soluble salts, dried in overheated steam at 120 to 180° C. for 3 hours, and calcined under a current of dry air for 4 hours at 360 respectively 400° C. In the resulting gels, the amount of aluminum oxide was 0.56% by weight. Comparatively, a sample of gel beads was only tempered at 204° C. for 8 hours in dry air stream. The data are tabulated below. In Table III data are also registered of silica gel beads without pulverulent additives which have about 2.8 weight percent aluminum oxide based on dry weight. Sample 28 is tempered at 204° C., sample 29 is calcined at a temperature over 500° C.

It is apparent from the data that the gels of the invention are characterized by remarkable water-resistance and high stability to breakage upon exposure to water combined with high desiccant properties and high resistance of abrasion even though the gels are calcined at a temperature as low as 300° C. and not exceeding 400 respectively 450° C. Very satisfactory products of the invention are characterized by water-resistance of at least 70%, preferably 80% and high drying capacity corresponding a breakpoint capacity of about 15% by weight, preferably 18% by weight in 300 minutes. The more desirable products generally have a vibration weight, i.e. a bulk density not exceeding 0.74 g./cm.$^3$, often in the range of 0.64 or 0.70 to 0.72 g./cm.$^3$, for products of a water-resistance over 90%. Mean pore diameter have been noted in the range of 23 to 29 A. It is also apparent from the data that the silica gel beads provided with the pulverulent additives which posses the optimum LSA-values have a water-resistance of about 95% by weight by aging for 3 hours and calcination at 400° C. The silica gel beads loaded with the pulverulent additives in the maximum range having lower LSA-values have on these conditions a lower water-resistance. Gel beads without additives become only a water-resistance of about 50% by calcination at a temperature over 500° C., the drying capacity is then reduced to about a quarter.

TABLE III

| Example | Aging time of the hydrogel in hours | Vibration weight in g./cm.$^3$ | LSA values in seconds | Water-resistance in weight percent | Break-point capacity in weight percent/minutes | Calcination | |
|---|---|---|---|---|---|---|---|
| | | | | | | Time in hours | Temperature |
| 25 | 4 | 0.60 | 120 | 0.0 | 19.1/357 | | |
| 26 | 4 | 0.63 | 155 | 68.6 | 15.1/255 | 4.0 | 360 |
| 27 | 4 | 0.62 | 210 | 66.8 | 15.0/257 | 4.0 | 400 |
| 28 | 4 | 0.80 | 40 | 0.0 | 18.5/312 | | |
| 29 | 4 | 0.87 | 65 | 47.0 | 4.5/90 | 6.0 | 500 |

I claim:
1. The process for manufacturing silica gel desiccants having high resistance to water, attrition resistance, and drying capacity which comprises
mixing an acid aluminum salt solution and an alkali metal silicate solution provided with a pulverulent dried gel from the group of pure silica gel and silica gels containing up to about 3 weight percent alumina based on the weight of the dried gel, having an average particle diameter between 1 and 5 microns, in an amount ranging from about 25 to about 33% by weight of the suspension to form a hydrosol;
gelling the hydrosol to form a hydrogel containing zeolitic alkali metal;
cooling the resulting hydrogel promptly after gellation;
aging the hydrogel in an aqueous solution at a temperature below that at which gellation occurred for about 1.5 to 7 hours without substantial base exchange occurring;
carrying out a base exchange with dilute sulfuric acid or aluminum sulfate to remove zeolitic alkali metal, washing, drying, and calcining the resulting silica gel at a temperature between about 300 to about 450° C.

2. The process of claim 1 in which hydrogel spheroids are manufactured, which comprises the additional steps of introducing a gellable silica hydrosol as a plurality of spheroidal globules into a body of a liquid immiscible therewith, maintaining the globules in said liquid until gellation occurs and separating the globular gel.

3. In the process of claim 1, the improvement which comprises calcining the hydrogel at a temperature in the range of about 300 to 400° C.

4. The process of claim 1 in which the pulverulent manufactured from dried gel is dried off-size beads of the desiccants.

5. The process of claim 1 in which the calcination is carried out for about 1 to about 8 hours.

6. In a process for manufacturing adsorbent silica gel having high resistance to water and high drying capacity which comprises forming a hydrogel comprising a metal oxide, aging the hydrogel at a temperature below that at which gelation occurred, base exchanging to remove zeolitic alkali metal, washing and drying the hydrogel, the improvement which comprises calcining the hydrogel at a temperature in the range of about 300 to 450° C.

7. The process of claim 1 wherein the drying is carried out slowly in superheated steam at 120 to 180° C., followed by slow tempering at about 240° C. before the resulting silica gel is calcined.

8. In the process of claim 2, the improvement which comprises calcining the hydrogel at a temperature in the range of about 300 to 400° C.

9. The process of claim 2 which comprises as a further improvement, aging the hydrogel for a period of about 1.5 to about 7 hours.

10. A silica gel desiccant of high resistance to water comprising an inorganic oxide gel comprising a dried gel from the group of the pure silica gel and the silica gels containing up to about 3 weight percent of alumina based on the weight of the dried gel and being characterized by a water-resistance of at least 70 weight percent of whole beads, high desiccant and attrition properies corresponding to a breakpoint capacity of about at least 15% by weight in 300 minutes, pores of a means pore diameter in the range of 23 to 29 A., and having a bulk density of about 0.64 to 0.74 g./cm.$^3$.

11. The gel of claim 10 which is a bead.

12. A silica gel desiccant of high resistance to water comprising an inorganic oxide gel and being characterized by a water-resistance of at least 80%, high desiccant and attrition properties, and having been calcined at a temperature in the range of about 300° to about 450° C.

13. The silica gel of claim 12 in which the gel is being further characterized by having a bulk density in the range of about 0.64 to 0.74 g./cm.$^3$.

14. The gel of claim 12 which is further characterized by pores of a mean pore diameter in the range of 23 to 29 A.

15. The silica gel desiccant of claim 12 in which the gel is selected from the group of pure silica gel and the silica gels containing up to about 3 weight percent of alumina based on the weight of the dried gel.

16. A silica gel desiccant of high resistance to water comprising an inorganic oxide gel comprising a dried gel from the group of the pure silica gel and the silica gels containing up to about 3 weight percent of alumina based on the weight of the dried gel and being characterized by a water-resistance of at least 70 weight percent of whole beads, high desiccant and attrition properties corresponding to a breakpoint capacity of about at least 15% by weight in 300 minutes, and a bulk density not exceeding 0.74 g./cm.$^3$.

17. The desiccant of claim 16 wherein the dried gel additive has a particle of average diameter of 1 to 5 microns and is in amount of 25 to about 33% by weight.

References Cited

UNITED STATES PATENTS

| 2,462,798 | 2/1949 | Wilson | 252—451X |
|---|---|---|---|
| 3,363,979 | 1/1968 | Schwartz et al. | 252—448X |
| 2,900,349 | 8/1959 | Schwartz | 252—317 |
| 2,966,466 | 12/1960 | Schwartz | 252—448 |

HERBERT B. GUYNN, Primary Examiner

I. GLUCK, Assistant Examiner

U.S. Cl. X.R.

23—182; 252—317, 448, 451